Patented Oct. 13, 1953

2,655,510

UNITED STATES PATENT OFFICE 2,655,510

WATER-SOLUBLE MONO-BETAINE HYDRAZONES OF THE AMINOCHROMES AND PROCESS OF PREPARING SAME

Harry Sobotka, New York, N. Y., assignor to Mount Sinai Hospital Research Foundation, Inc., New York, N. Y., a membership corporation of New York No Drawing. Application October 19, 1949,
Serial No. 122,357

8 Claims. (Cl. 260—319)

This invention relates to water-soluble derivatives of aminochromes and to a process for preparing the same.

The term "aminochromes" as used herein is intended to designate certain oxidation products of α-dihydroxyphenyl-β-alkylamino - alkanes, and more particularly the orthoquinones of the dihydroindoles. Oxidation of these compounds by bromine, iodates, silver oxide and also by specific oxidases of the tyrosinase type, leads to the formation of dark-red or purple oxidation products which have been formulated as orthoquinones of dihydroindoles, the carbonyl groups being presumably in positions 5 and 6:

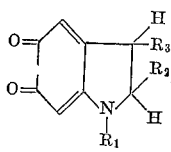

wherein $R_1$ may be an alkyl group such as methyl, ethyl or isopropyl; $R_2$ may be H or the methyl group; and $R_3$ may be H or OH. An alternative formulation as paraquinoid betaine or "zwitterion" has also been proposed:

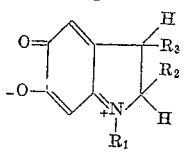

When using bromine or iodate as the oxidizing agent, halogen substitution also occurs on carbon atom 2 in the heterocycle. The earliest known representative of the aminochromes has been designated adrenochrome, obtainable from adrenalin; similarly, the corresponding cyclized oxidation product of epinine may be designated as "epinochrome," of aludrine as "aludrinochrome," etc.

Several pharmacological effects have been observed with, or ascribed to, adrenochrome and its analogs. It has been found that the injection of 10–20 mg. of halogenoadrenochrome, repeated once or twice, into experimentally hypertensive animals exerts a strong and protracted "antipressor" effect, i. e., it produces a lowering of the arterial blood pressure to normal levels for a period of several weeks. Amounts of 1.0 mg. and less have been shown to shorten the bleeding time in experimental animals and man, an effect designated as "hemostatic."

However, aminochromes are in general only slightly soluble in water, physiological saline and other aqueous solutions. Moreover, such dilute aqueous solutions are very unstable and betray the decomposition of the active principle by discoloration and melanization at room temperature within a few minutes after preparation of the solution. On the other hand, their solution or suspension in fatty oils or propylene glycol is unsuitable for therapeutic usage.

Adrenochrome derivatives having increased stability have been prepared by reacting adrenochrome with various nitrogenous "keto"-agents, such as hydroxylamine, semicarbazide and substituted hydrazines. (Belgium Patent No. 453,374.) However, the resulting oximes, semicarbazones and hydrazones are but slightly soluble in water at normal or body temperature, their solubility not exceeding 0.05 percent or one part in 2000.

I have prepared highly water-soluble derivatives of the aminochromes which are stable and injectable in neutral sterile aqueous solution. More particularly, I have found that the aminochromes form extremely water-soluble and stable compounds with hydrazides of acetic acid carrying a quaternary nitrogen atom such as trimethylacethydrazide ammonium chloride. These hydrazides may be properly referred to as betaine hydrazides. The resulting condensation products (betaine hydrazones) dissolve in water, physiological saline or phosphate buffer solutions in a proportion of up to 20 percent. These solutions, adjusted to pH 6–7.5, and after passage through a sterile filter show no decomposition or discoloration after standing for six months at 4° C. They have been injected intravenously and intramuscularly in quantities up to 500 mg. into dogs without any toxic effects except for symptoms due to their acute effect on the blood pressure.

Betaine hydrazides of the type used in preparing the betaine hydrazones of the present invention have been used as a chemical tool in the isolation of ketonic hormone compounds with which they form transient, easily dissociated intermediates (Girard and Sandulesco, U. S. Patent No. 2,045,132), but so far as I am aware have never heretofore been used in forming water soluble condensation products sufficiently stable to warrant consideration for pharmaceutical purposes.

The synthesis of the new compounds of the present invention is described in the following examples:

*Example I.—Trimethylacethydrazone ammonium chloride of L-adrenochrome*

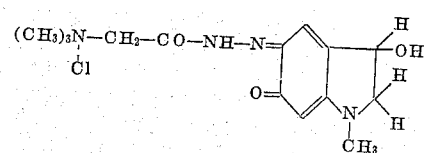

3.6 g. (0.02 mol.) L-adrenochrome were dissolved in 100 cc. absolute methanol containing 1% glacial acetic acid and 3.6 g. (0.022 mol.) trimethylacethyrazide ammonium chloride were added and the solution refluxed for 15 minutes.

The color changed from red to orange-brown indicating the progress of the condensation reaction. To the cooled solution was added 300 cc. ice-cold absolute ether. The oily derivative which crystallized on standing was redissolved in 200 cc. dry methanol and purified by shaking with or chromatographing on aluminum oxide of slightly acid reaction. The orange-red supernatant (or eluate), when concentrated in vacuo under nitrogen, yields the trimethyl acetylhydrazone-ammonium chloride of L-adrenochrome in a yield of 6.5 g. The substance consists of cinnabar-red crystals, melting under decomposition at 150° C. On elementary analysis, it shows the composition demanded by the formula $$C_{14}H_{21}O_3N_4Cl$$

Adrenochrome when given the presently preferred paraquinoid betaine or "zwitterion" formulation may be represented by the following structural formula:

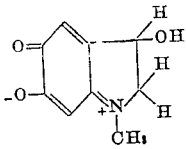

*Example II.* — *Trimethylacethydrazone ammonium chloride of epinochrome*

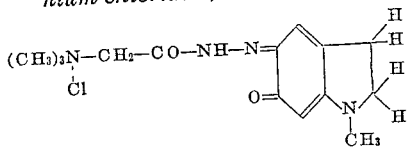

Epinochrome was prepared from epinine (desoxyepinephrine) hydrochloride by oxidation with silver oxide in absolute methanol containing 2% formic acid. 3.3 g. epinochrome was condensed with trimethylacethydrazide ammonium chloride under the conditions of Example I. The resulting product consists of red crystals melting under decomposition at 140° C. Epinochrome may be represented by the following structural formula:

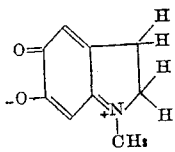

*Example III.*—*Trimethylacethydrazone ammonium chloride of DL-aludrinochrome*

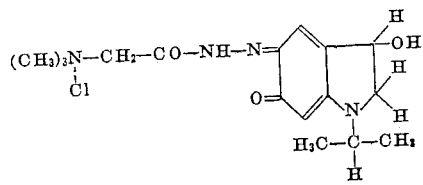

The N-isopropyl homolog of DL-epinephrine, commercially known as Aludrine or Isuprel, was oxidized in a mixture of 4 parts methanol and 6 parts isopropanol with silver oxide to 1-isopropyl-3-hydroxy-5,6-diketotetrahydroindole ("aludrinochrome"). This purplish-red crystalline compound was condensed in the manner described previously with trimethylacethydrazide ammonium chloride to yield a reddish-brown hydrazone melting under decomposition of 195° C. Aludrinochrome may be represented by the following structural formula:

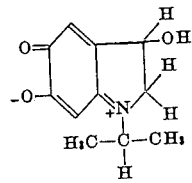

Instead of carrying on the condensation of the aminochrome after this compound has been isolated in solid form, the condensation may be carried out directly in the acetic methanol solution of the respective aminochrome. If this is done, the resulting hydrazone will require further purification by recrystallization.

It will be understood that the specific aminochromes mentioned above are cited by way of example only, and that the process may be carried on with the use of any of the orthoquinones of the dihydroindoles having the structural formula:

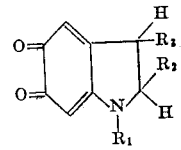

wherein $R_1$ may be an alkyl group such as methyl, ethyl, or isopropyl; $R_2$ may be H or the methyl group; and $R_3$ may be H or OH. Others of the known orthoquinones of dihydroindoles are the aminochrome derivatives of ethyl "adrenaline" and N-methyl-cobrefrine. The aminochrome may be either the dextro, the laevo or the optically inactive, racemic, form. Likewise, the hydrazide may be any acethydrazide conforming to the formula:

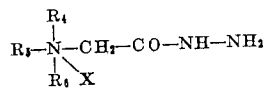

wherein $R_4$, $R_5$ and $R_6$ represented three alkyl groups individually attached to the quaternary nitrogen atom, and X is a monovalent anion such as $Cl^-$, $Br^-$, $HSO_4^-$ or $OH^-$.

In its broader aspects the invention may be defined as including any of the aminochrome derivatives falling within the formula:

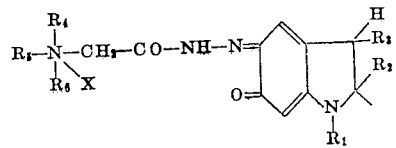

$R_1$–$R_6$ and X having the meanings set forth above.

I claim:
1. The process of producing water-soluble trialkyl mono-betaine hydrazones of aminochromes conforming to the formula:

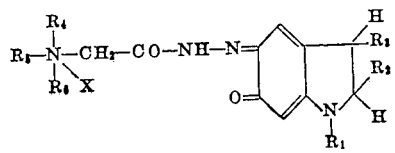

wherein $R_1$ is selected from the group consisting of methyl, ethyl and isopropyl radicals; $R_2$ is selected from the group consisting of hydrogen and the methyl radical; $R_3$ is selected from the group consisting of hydrogen and the hydroxy radical; $R_4$, $R_5$ and $R_6$ represent alkyl groups, and X is a monovalent anion, which comprises reacting an orthoquinone of a dihydroindole having the formula:

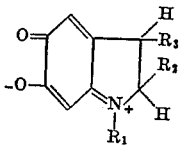

with an acethydrazide having the formula:

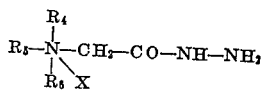

the symbols $R_1$, $R_2$, $R_3$, $R_4$, $R_5$, $R_6$ and X used in defining the formulas for the orthoquinone and the acethydrazide having the same meaning as set forth in defining the reaction product.

2. The process of producing trimethyl acethydrazone ammonium chloride of adrenochrome conforming to the formula:

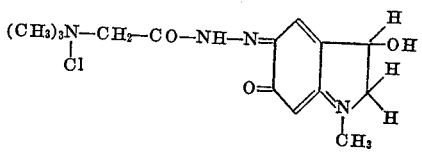

which comprises reacting adrenochrome having the formula

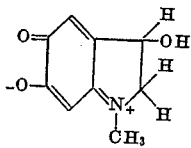

with trimethyl acethydrazide ammonium chloride having the formula:

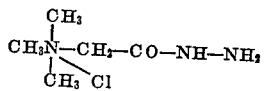

3. The process of preparing trimethyl acethydrazone ammonium chloride of epinochrome having the structural formula:

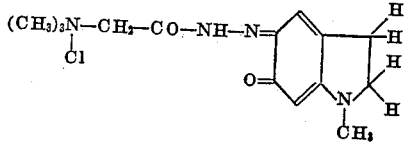

which comprises reacting epinochrome having the formula:

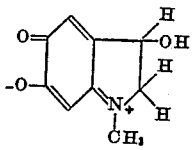

with trimethyl acethydrazide ammonium chloride having the formula:

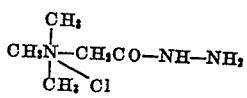

4. The process of producing trimethyl acethydrazone ammonium chloride of aludrinochrome having the structural formula:

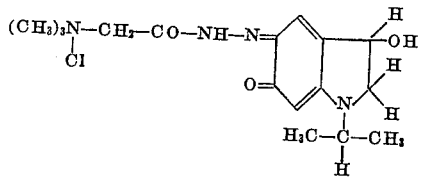

which comprises reacting aludrinochrome having the formula:

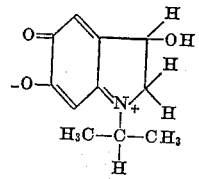

with trimethyl acethydrazide ammonium chloride having the formula

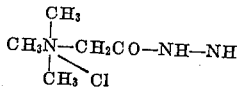

5. A water-soluble aminochrome derivative conforming to the formula:

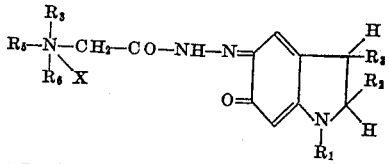

wherein $R_1$ is selected from the group consisting of the methyl, ethyl and isopropyl radicals; $R_2$ is selected from the group consisting of hydrogen and the methyl radical; $R_3$ is selected from the group consisting of hydrogen and the hydroxy radical; $R_4$, $R_5$ and $R_6$ represent alkyl groups, and X is a monovalent anion.

6. The trimethyl acethydrazone ammonium chloride of adrenochrome having the structural formula:

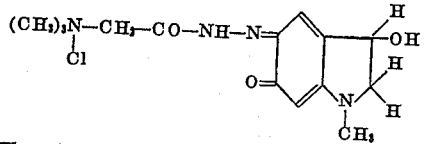

7. The trimethyl acethydrazone ammonium chloride of epinochrome having the structural formula:

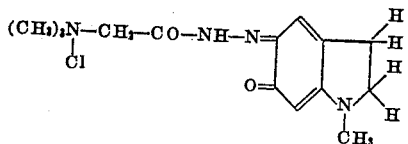

8. The trimethyl acethydrazone ammonium chloride of aludrinochrome having the structural formula:

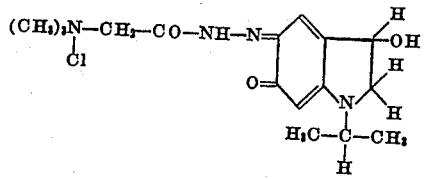

HARRY SOBOTKA.

No references cited.